(12) United States Patent
Kilibarda

(10) Patent No.: US 7,896,217 B2
(45) Date of Patent: *Mar. 1, 2011

(54) WELDING STATION FRAMING APPARATUS WITH BREAKAWAY PROVISION

(75) Inventor: Velibor Kilibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 1234 days.

This patent is subject to a terminal disclaimer.

(21) Appl. No.: 11/412,588

(22) Filed: Apr. 27, 2006

(65) Prior Publication Data

US 2006/0242823 A1  Nov. 2, 2006

Related U.S. Application Data

(60) Provisional application No. 60/675,222, filed on Apr. 27, 2005.

(51) Int. Cl.
*B23K 1/14* (2006.01)
(52) U.S. Cl. ...................................... 228/49.1
(58) Field of Classification Search ............ 228/49.1
See application file for complete search history.

(56) References Cited

U.S. PATENT DOCUMENTS

| | | | |
|---|---|---|---|
| 3,595,105 A * | 7/1971 | Wagner | 81/474 |
| 4,162,387 A | 7/1979 | De Candia | 219/79 |
| 4,442,335 A | 4/1984 | Rossi | 219/79 |
| 4,535,927 A | 8/1985 | Matsubara et al. | 228/6.1 |
| 4,606,488 A | 8/1986 | Yanagisawa | 228/45 |
| 4,629,109 A | 12/1986 | Matsushita | 228/49.1 |
| 4,972,987 A | 11/1990 | Di Rosa | 228/4.1 |
| 5,174,488 A | 12/1992 | Alborante | 228/4.1 |
| 5,265,317 A | 11/1993 | Angel | 29/429 |
| 5,267,683 A | 12/1993 | Hamada et al. | 228/4.1 |
| 5,374,799 A | 12/1994 | Nishimoto et al. | 219/117.1 |
| 5,400,943 A | 3/1995 | Rossi | 228/6.1 |
| 5,400,944 A | 3/1995 | Zimmer et al. | 228/49.6 |
| 5,427,300 A | 6/1995 | Quagline | 228/4.1 |
| 5,548,096 A | 8/1996 | Akasaka et al. | 219/117.1 |

(Continued)

FOREIGN PATENT DOCUMENTS

JP   11-179557   7/1999

*Primary Examiner* — Jessica L Ward
*Assistant Examiner* — Nicholas P D'Aniello
(74) *Attorney, Agent, or Firm* — Young Basile

(57) ABSTRACT

A motor vehicle car body framing apparatus for use at a welding station, the apparatus including a gate having a frame structure and a plurality of tooling members carried by the frame structure for use in positioning components of the vehicle body at the welding station for welding. The tooling members are mounted on the frame structure by a plurality of mounting brackets. Each mounting bracket includes a base member mounted on the frame structure and a riser mounted on the base and mounting a respective tooling member. The riser is fixedly mounted on the base by a single central fastener bolt which may include a reduced diameter portion sized to break away in response to predetermined impact against the riser. Each mounting bracket further includes means defining a triangulated mounting interface between the base and the riser arranged in concentric relation to the fastener bolt. The triangulated mounting interface may comprise a raised ring surface on one of the base and the riser centered on the axis of the fastener bolt and positioned at the mounting interface of the base and the riser. Each mounting bracket further includes two dowels received in aligned apertures in the base and in the riser at locations flanking the axis of the fastener bolt.

15 Claims, 7 Drawing Sheets

U.S. PATENT DOCUMENTS

| | | | |
|---|---|---|---|
| RE36,541 E | 2/2000 | Rossi | 228/6.1 |
| 6,173,881 B1 | 1/2001 | Sloan et al. | 228/4.1 |
| 6,344,629 B1 | 2/2002 | Kato et al. | 219/148 |
| 6,467,675 B1 | 10/2002 | Ozaku et al. | 228/175 |
| 6,691,392 B2 | 2/2004 | Savoy et al. | 29/407.09 |
| 6,835,909 B2 | 12/2004 | Nakamura et al. | 219/86.7 |
| 6,908,024 B2 | 6/2005 | Martin et al. | 228/115 |
| 6,932,263 B2 | 8/2005 | Kilibarda et al. | 228/49.1 |
| 6,966,421 B2 | 11/2005 | Nakamura | 198/345.1 |
| 2005/0035175 A1 | 2/2005 | Nakamura et al. | 228/44.3 |
| 2006/0289414 A1 | 12/2006 | Kilibarda et al. | 219/158 |

\* cited by examiner

WELDING STATION FRAMING APPARATUS WITH BREAKAWAY PROVISION

RELATED APPLICATION

This application claims the priority of U.S. Provisional Patent Application 60/675,222, filed on Apr. 27, 2005.

FIELD OF THE INVENTION

This invention relates to a production line framing apparatus for clamping and thereafter welding a loosely assembled vehicle body and more particularly to a framing apparatus that accurately positions and locates predetermined areas of a loosely assembled vehicle body at a welding station for accurately clamping and welding the vehicle body together with a high degree of repeatability between consecutive vehicle bodies on the production line

BACKGROUND OF THE INVENTION

The construction of a unitized vehicle body commences with the formation of individual major body panels by stamping the panels from sheet metal blanks. Typically these major panels include a floor panel, right and left body side panels, a fire wall and either a roof panel or transversely extending header members to which a roof panel is subsequently mounted. After the individual panels are stamped, some preliminary assembly operations may then be performed on the individual panels such as, for example, adding door hinge and latch hardware at the body side panels at appropriate locations proximate the door opening, adding seat mounting brackets, adding reinforcements to the body panel, etc.

Next a set of panels that together constitute a sub-assembly of the finished vehicle body is loosely assembled together. This initial loose assembly of panels frequently is accomplished by a "toy tab" arrangement in which one or more panels is formed with a tab which projects from an edge and which is received in a slot in an adjacent panel. This technique interlocks the panels and frame members to each other to thereby form a preliminary loosely assembled vehicle body wherein the panels and frame members will not separate from each other but wherein the panels and frame members are free to tilt or otherwise move relative to one another. This initial loosely-assembled subassembly is then brought, as for example by a pallet riding on rails, to a welding station where the various panels and frames are welded to each other in a rigid permanently assembled relationship. This initial welding operation step at the welding station is one of the most important steps in the assembly of the vehicle body because it establishes the final welding alignment of all of the various panels and headers relative to each other which is essential to subsequent assembly operations performed on the sub-assembly. During the welding operation it is desirable that the various panels and headers be precisely and accurately located and aligned relative to one another and be held fixedly in the desired position. The positioning of the various panels and header members during the welding operation at the welding station is accomplished utilizing a framing apparatus located at the welding station and including a plurality of gates. For example, a pair of side gates may be utilized in combination with a top gate with the gates moveable between retracted positions, to allow the entry of the vehicle assembly into the welding station, and working positions wherein tooling members carried by the gates suitably engage the assembled body panels to fix them into desired finalized positions whereafter programmable welding robots, each provided with a welding gun, perform welding operations on the assembled body components as they are held in place by the gates and the tooling members.

Prior art welding gates tend to be rather bulky and heavy apparatuses due to the necessity of carrying many and sometimes rather complicated and heavy tooling members and this heavy construction of the gates has necessitated cumbersome and expensive power equipment to move the gates between their retracted and working positions. The bulky and heavy construction of the welding gates has also interfered with the ability of the robots to access the vehicle body components located within the gates.

In an attempt to reduce the bulk and weight of the gates, gates having an open frame or skeletal structure have been utilized but these open frame structure gates, by their fragile nature, have difficulty in handling all of the heavy tooling members and are subject to damage as a result of inadvertent impact with obstacles. Such impacts may not only damage the gate but may also misalign tooling members carried by the gate with resultant imprecise joinder of the various body panels.

SUMMARY OF THE INVENTION

This invention is directed to the provision of an improved framing apparatus for use at a car body welding station.

More particularly, this invention is directed to the provision of a framing apparatus utilizing a relatively light weight gate that is yet capable of handling even very heavy tooling members.

Yet more particularly, this invention is directed to the provision of a framing apparatus with breakaway provisions to preclude damage to the gate and/or the tooling members in the event of inadvertent encounters with obstacles.

The motor vehicle car body framing apparatus of the invention is intended for use at a welding station and includes a plurality of tooling members for use in positioning components of the vehicle body at the welding station for welding, the tooling members being mounted on the framing apparatus by a plurality of mounting brackets.

According to the invention, each mounting bracket includes a base member mounted on the framing apparatus and a riser mounted on the base and mounting a respective tooling member; the riser is fixedly mounted on the base by a single central fastener bolt; and the fastener bolt includes a reduced diameter portion sized to break away in response to predetermined impact against the riser.

According to a further feature of the invention, the fastener bolt passes through an unthreaded central aperture in the riser for threaded engagement with a threaded central aperture in the base.

According to a further feature of the invention, the fastener bolt includes a head portion and a shank portion and the shank portion defines the reduced diameter portion.

According to a further feature of the invention, the head portion also includes a reduced diameter portion and the reduced diameter portion of the head portion is designed to shear before the reduced diameter portion of the shank portion so that the tightening of the fastener bolt until the reduced diameter head portion shears has the effect of pre-torqueing the fastener bolt to the torque level required to shear the reduced diameter head portion.

According to a further feature of the invention, each mounting bracket further includes at least one dowel received in aligned apertures in the base and in the riser at a location offset from the axis of the fastener bolt.

According to a further feature of the invention, each mounting bracket includes two dowels received in aligned apertures in the base and in the riser at locations flanking the axis of the fastener bolt.

According to a further feature of the invention, each base includes a planar platform portion mounting the respective riser and a plurality of legs extending from the platform portion and sized to straddle the frame structure.

According to a further feature of the invention; each riser is mounted on the base by a single central fastener bolt and the interface between the riser and the base comprises a plurality of contact points arranged in concentric relation with respect to the fastener bolt.

According to a further feature of the invention, the contact points at the interface between the riser and the base define a triangulated mounting interface.

According to a further feature of the invention, the means defining the triangulated mounting interface comprises a raised ring surface on one of the base and the riser centered on the axis of the fastener bolt and positioned at the mounting interface of the base and the riser.

In one embodiment of the invention, the raised ring surface is defined on the base and a series of lugs are defined on the inner periphery of the ring surface with each lug defining an aperture for receipt of a dowel.

In another embodiment of the invention, the raised ring surface is defined on the riser and the raised ring surface as received in a socket formed in a confronting face of the base.

The invention also sets forth similar features relating to the mounting bracket per se and to the methodology employed in mounting the mounting bracket on the framing apparatus.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENTS

Figure 1:
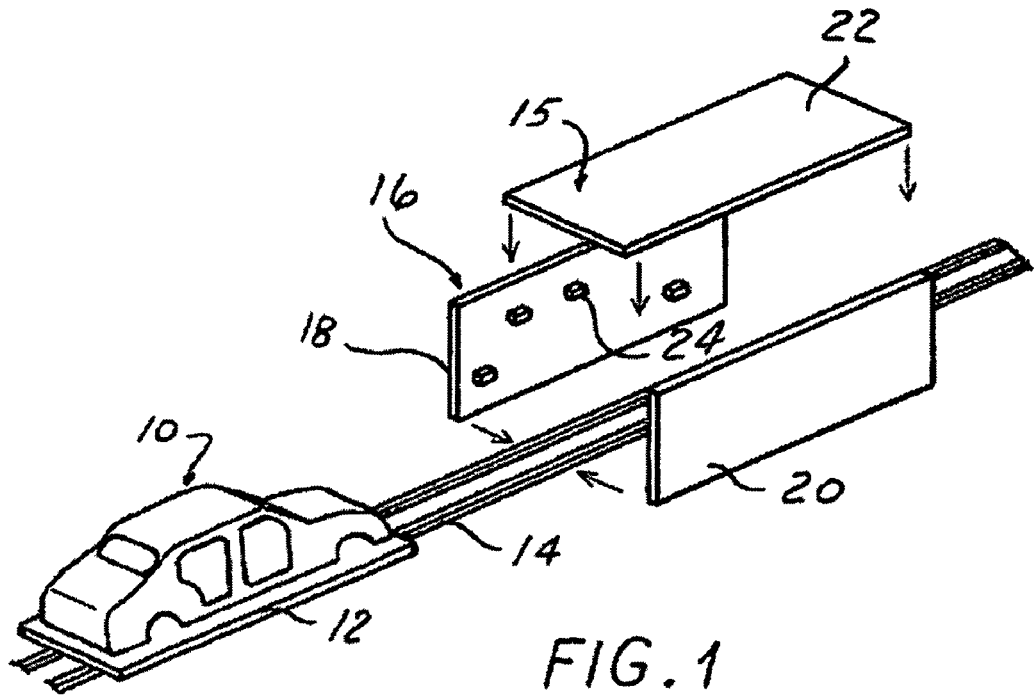
FIG. 1 is a schematic view of a motor vehicle framing production line including a framing station.
Figure 2:
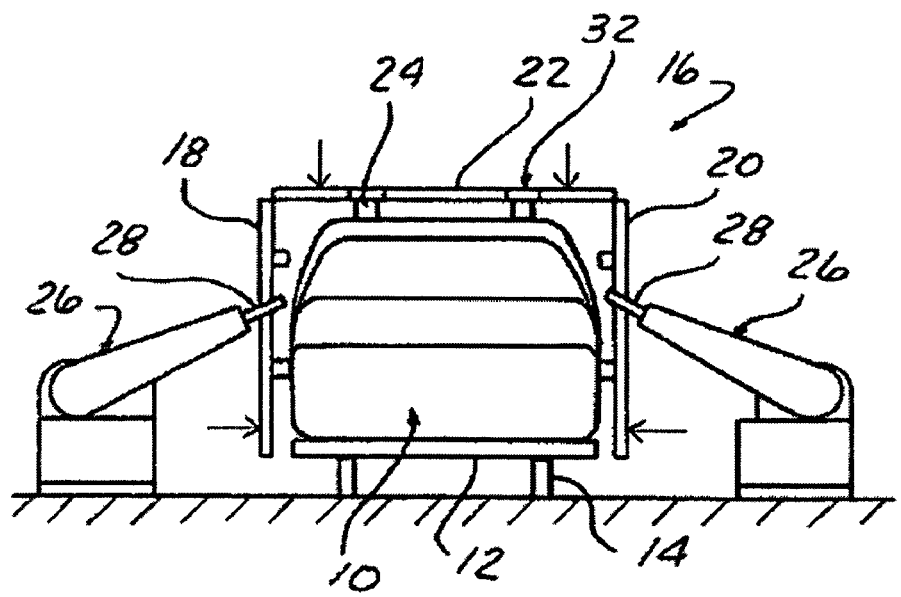
FIG. 2 is a schematic cross-sectional view of the framing station.

With reference to FIG. 1 an initial loosely assembled body subassembly seen generally at 10 is brought, as for example by a pallet 12 riding on rails 14, to a welding station 16 where the various panels and frames are welded to each other in a rigid permanently assembled relationship. The positioning of the various panels and header members during the welding operation at the welding station is accomplished utilizing a framing apparatus 15 including a plurality of gates. For example, as seen schematically in FIG. 1, a pair of side gates 18 and 20 may be utilized in combination with a top gate 22 with the gates moveable between retracted positions seen in FIG. 1, to allow the entry of the vehicle assembly 10 into the welding station, and working positions seen in FIG. 2, wherein tooling members carried by the gate suitably engage the assembled body panels to fix them into desired finalized positions whereafter programmable welding robots 26, each provided with a welding gun 28, perform welding operations on the assembled body components as they are held in place by the gates 18, 20 and 22 and the tooling members 24.

Figure 3:
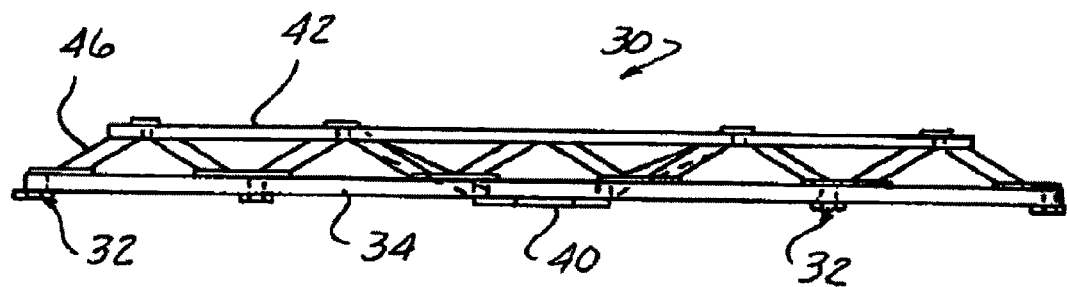
FIG. 3 is a side elevational view of a gate utilized at the framing station.
Figure 4:
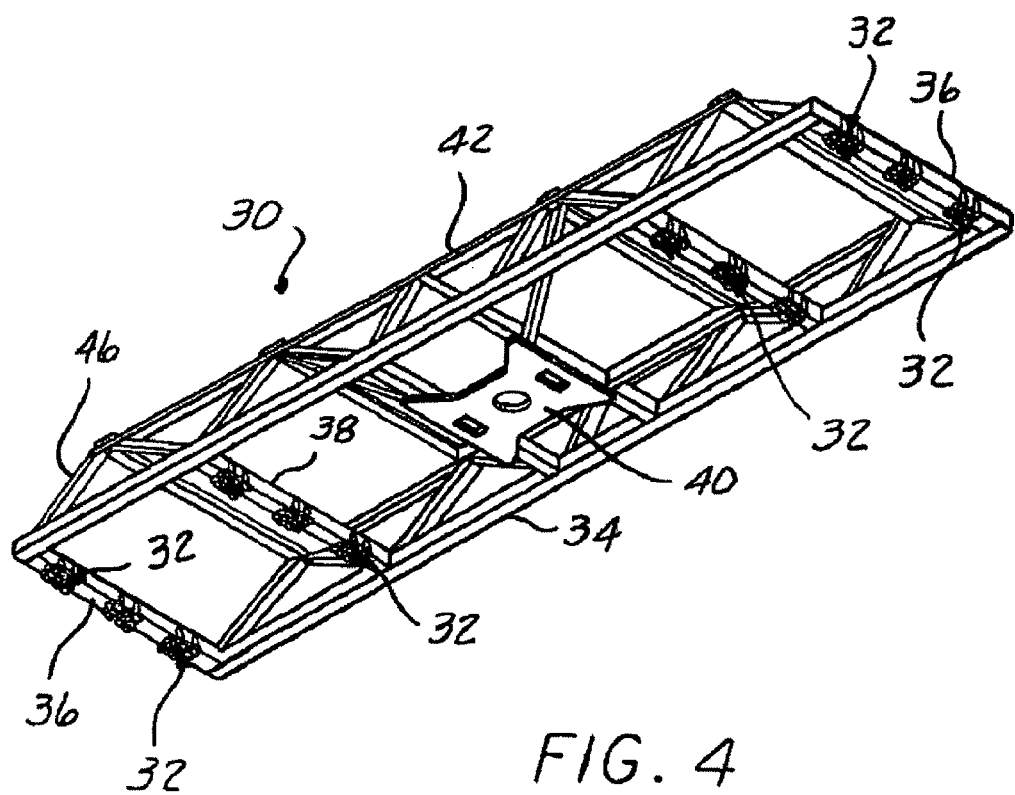
FIG. 4 is a perspective view of the gate viewed from below the gate.
Figure 5:
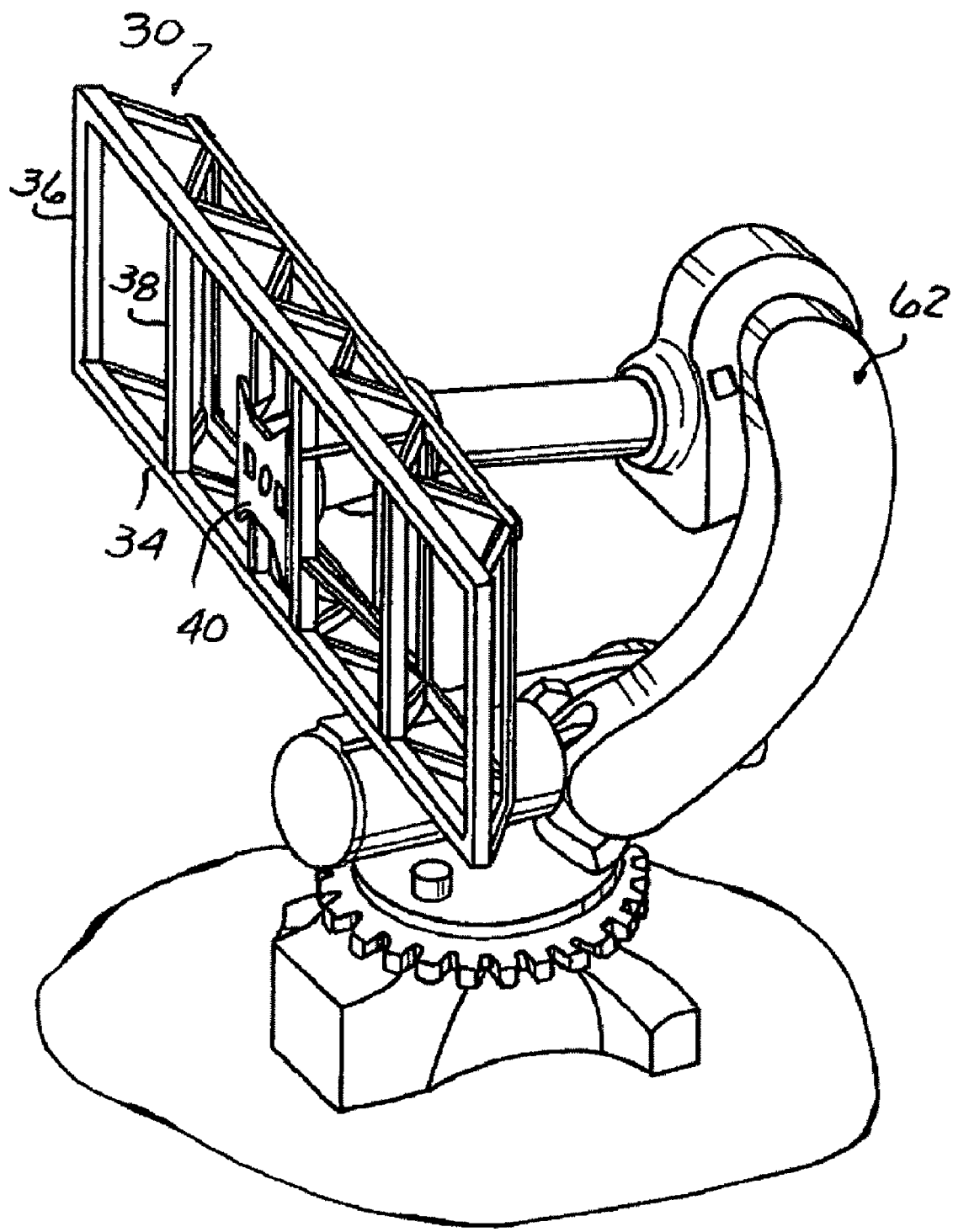
FIG. 5 is a perspective view showing a gate in conjunction with a robot utilized to position the gate.

The framing apparatus of the invention uses an open frame gate structure 30 (FIGS. 3-4) in combination with a plurality of mounting bracket structures 32 to facilitate attachment of the tooling members to the gate. Gate 30, which may comprise either a top gate or a side gate, has an open frame skeletal structure comprising skeletal, parallel, longitudinal side members 34, skeletal end cross-members 36, skeletal immediate cross-members 38, a central robot mounting plate 40, skeletal upper parallel side rails 42, skeletal upper cross-members 44, and lattice members 46 interconnecting each upper side rail to the respective lower rail. All of the members of the frame are preferably formed of a lightweight tubular material of rectangular cross-section having a wall thickness of, for example, 60 thousandths of an inch and all of the members are formed of a suitable ferrous material. The frame components are secured together by welding utilizing suitable gussets 48.

Each mounting bracket structure 32 (FIGS. 6 and 7) includes a base 50, a riser 52, and a bolt structure 54.

Figure 6:
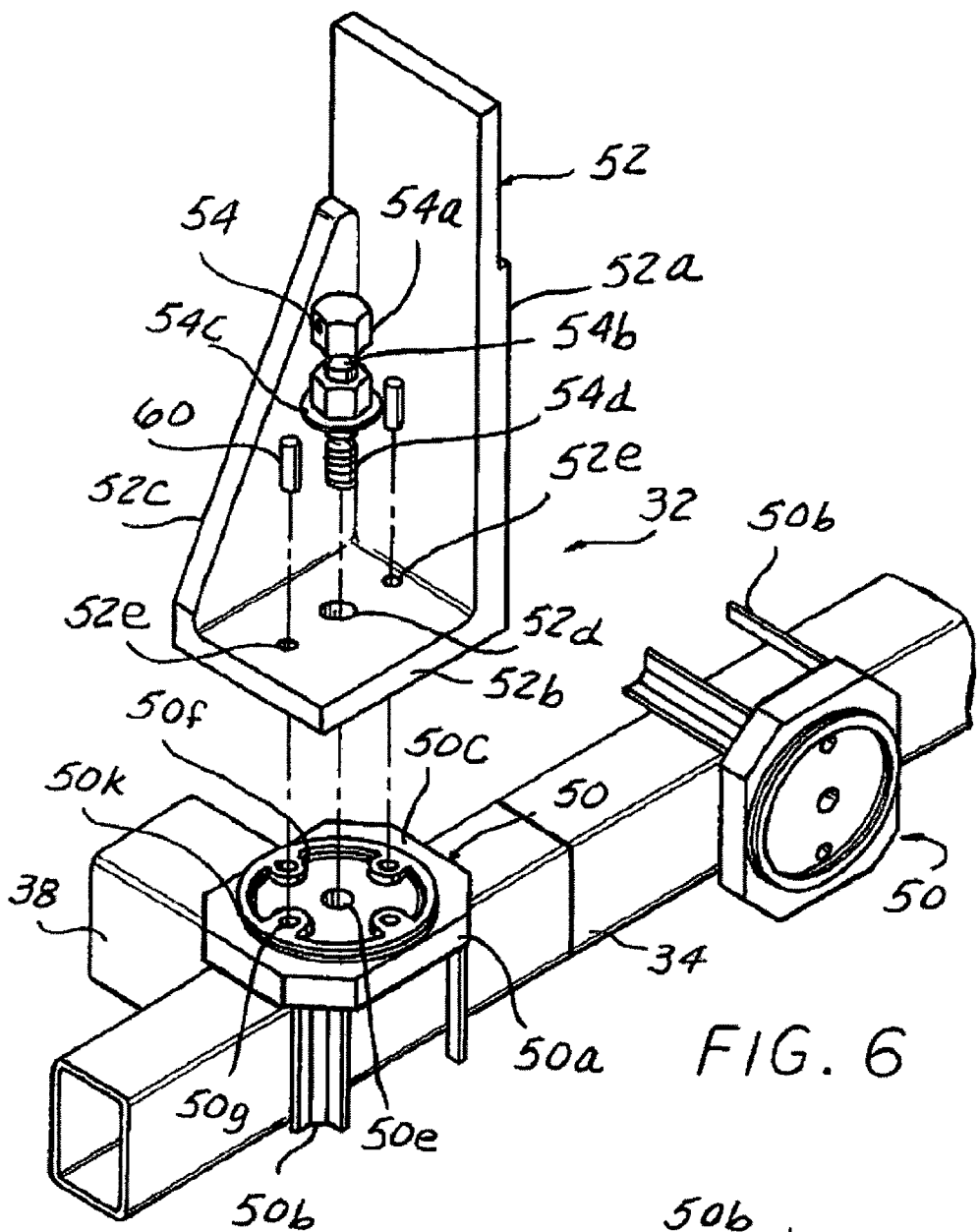
FIG. 6 is a exploded perspective view of a mounting bracket for use in mounting tooling members on the gate.
Figure 6A:
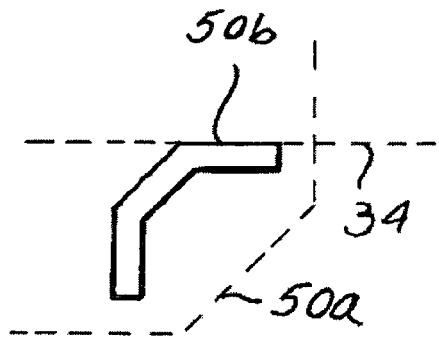
FIG. 6a shows a detail of FIG. 6.
Figure 7:
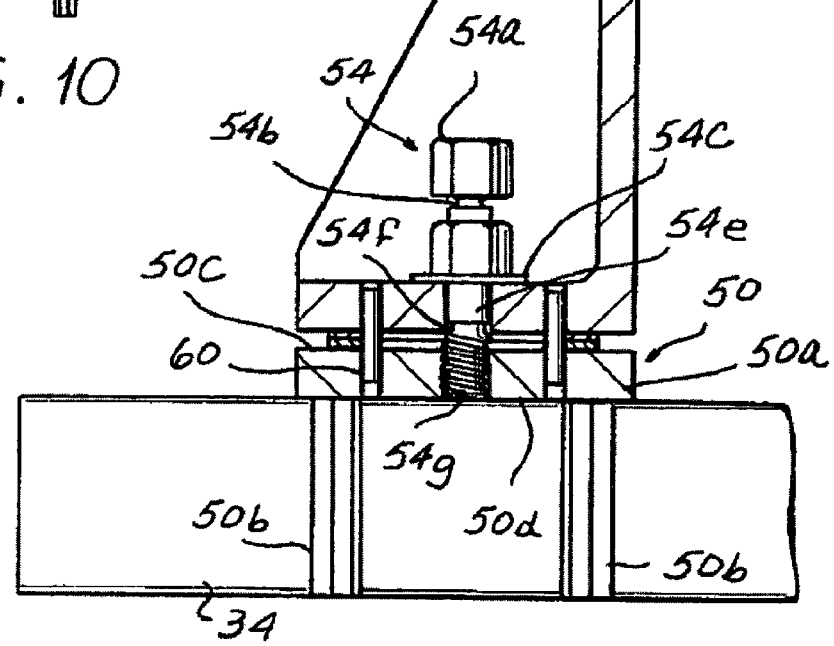
FIG. 7 is a cross-sectional view of the mounting bracket.
Figure 7A:
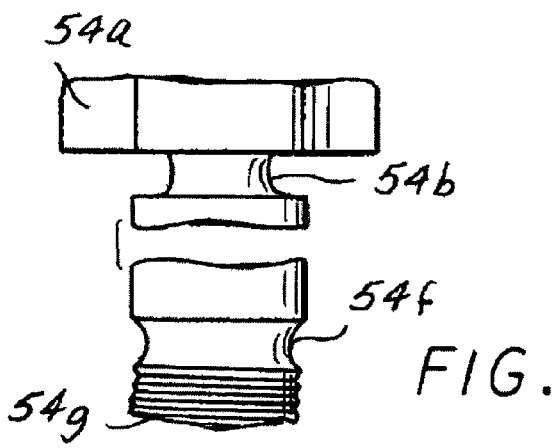
FIG. 7a shows a detail of FIG. 7.
Figure 8:
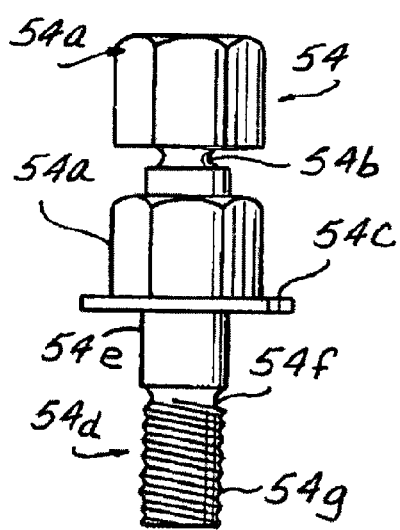
FIG. 8 is a detail view of a bolt structure utilized in the mounting bracket.

Base 50 may be formed as a cast ferrous structure and includes a planar platform portion 50a and a plurality of legs 50b integrally upstanding or downstanding from the platform portion. Platform portion 50a may have a generally rectangular or hexagonal configuration and legs 50b are positioned on the corners of the platform portion. Each leg 50b (FIG. 6a) had a right angle cross-sectional configuration and the platform portions and legs are configured and dimensioned such that the base 50 may be positioned over a skeletal frame member such for example as frame member 34 as best seen in FIG. 6. As shown, platform portion 50a may have a rectangular as opposed to a square configuration so that the legs 50b on the long sides of the rectangle are spaced apart further than the legs 50b on the short side of the rectangle so that the base may be positioned over the narrow top of a skeletal member 34 as seen on the left side of FIG. 6 or over the wider side of the member 34 as seen on the right side of FIG. 6 so that the base has universal application with respect to the skeletal members of the frame structure 30.

The platform portion 50a of each base defines a planar platform surface 50c removed from the side 50d from which the legs extend. A central threaded aperture 50e is provided in the platform portion proximate the geometric center of the platform portion and opening in the platform surface 50c, and a raised ring 50k is provided on the platform surface 50c centered on the threaded aperture 50e. A series of lugs 50f are provided on the inner periphery of ring 50k and each defines a central aperture 50g.

Each riser 54 includes a riser portion 52a, a horizontal portion 52b and a gusset portion 52c interconnecting the riser portion and the horizontal portion. A central unthreaded aperture 52d is provided in horizontal portion 52b proximate the geometric center of the horizontal portion 52b and a pair of further apertures 52e are provided in horizontal portion 52b in flanking relation to central bore 52d.

Bolt structure 54 (FIGS. 6, 7, 7a and 8) includes a hexagonal head portion 54a including a reduced diameter portion 54b, a flange portion 54c, and a shank portion 54d including a smooth shank portion 54e, a reduced diameter breakaway portion 54f, and a threaded shank portion 54g.

It will be understood that a bracket structure 32 is positioned on one of the skeletal members of the frame structure at any location along the frame structure wherein it is desired to position a tooling member 24 to engage a body component. The tooling member 24, which may typically comprise a clamp, is seen schematically in FIGS. 7 and 9.

In use, a base member 50 is positioned over a skeletal member of the frame with the legs in straddling relation to the skeletal member and the face 50d of the platform portion positioned against the skeletal member whereafter the base is welded to the frame member over the entire U-shaped interfaces between the base and the frame member as defined by the coacting of legs 50b and face 50d.

Figure 9:
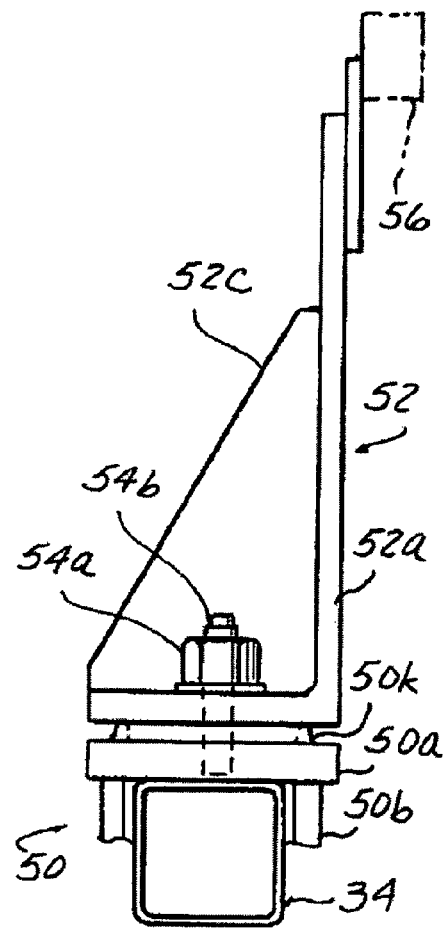
FIG. 9 illustrates a mounting bracket mounted on a gate.

Following welding of the base member 50 to the skeletal members of the frame, a pair of dowels or pins 60 are positioned in diametrically opposed apertures 50g in the platform portion; a riser 52 is positioned over the platform portion to pass the exposed ends of the dowels into the apertures 52e and align the unthreaded central riser aperture 52d with the threaded central base aperture 50e with the horizontal portion 52b seated against the ring 50e; a bolt structure 54 is passed downwardly through aperture 52d to threadably engage bolt threaded shank portion 54g in threaded bore 52e of the base platform portion; the bolt is tightened utilizing head 54a until the flange portion 54c seats against the upper face of horizontal portion 52b; and further torque is applied to the bolt via the head 54a until the reduced diameter portion 54b shears, as seen in FIG. 9. It will be understood that reduced diameter portion 54b is designed to shear before reduced diameter portion 54f and that the tightening of the bolt structure until the reduced diameter portion 54b shears has the effect of pre-torqueing the bolt to the torque level required to shear the reduced diameter portion 54b.

Figure 10:
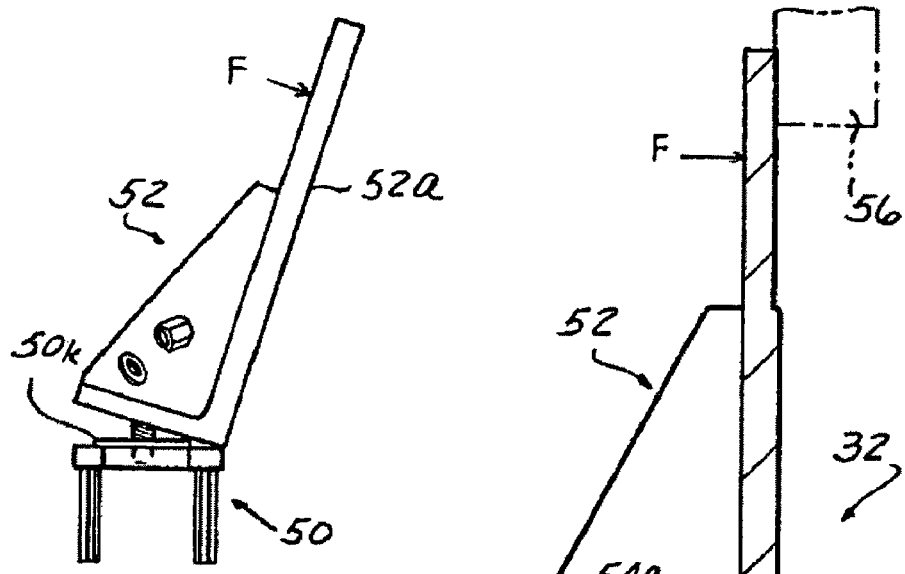
FIG. 10 illustrates a break away feature of the mounting bracket.

In use at the framing station, each open frame gate structure 30 is positioned by a robot 62 which is secured to robot mounting plate 40 and programmed in known manner. Ideally, the robot moves the gate into position at the framing station without encountering any obstacles and therefore without damaging the tooling members or, more importantly, the delicate frame structure. However, if an obstacle is encountered, the obstacle will typically exert a force F (FIG. 10) against the vertical portion 52a of a riser which in turn will cause the riser to tilt about a fulcrum defined by a point on the ring 50k which in turn will result in shearing or rupture of the reduced diameter bolt portion 54f which in turn will allow the riser and associated tooling member to break away from the base 50 and preclude twisting or other damage to the delicate frame structure 30 and/or dislocation of the tooling member carried by the riser portion and consequent mis-assembly of the respective automotive body components. The ring 50k has the effect of defining a fulcrum comprised of a locus of interface points concentrically equal distant from the central bore 50e so that no matter in which direction the impact F is exerted on the riser portion 52a the same moment will be applied to the riser and to the bolt structure and the same force will result in an identical rupture pattern with respect to the reduced diameter bolt structure portion 54f. Since the interface between the riser and the base is only along the well defined ring surface 50k, the ring surface 50k also has the effect of insuring that the riser will engage the base at a plurality of contact points at the interface between the riser and the base arranged in concentric relation with respect to the fastener bolt and, specifically, insures that the riser engages the bolt in a triangulated manner to provide a firm positive inter-engagement between the riser and the base.

The dowels 60 function to preclude lateral or sliding movement of the riser on the base whereby to assure a uniform moment arm for the load as defined by the locus point on the ring 50k, irrespective of the obstacle angle of attack or point of attack.

Figure 11:
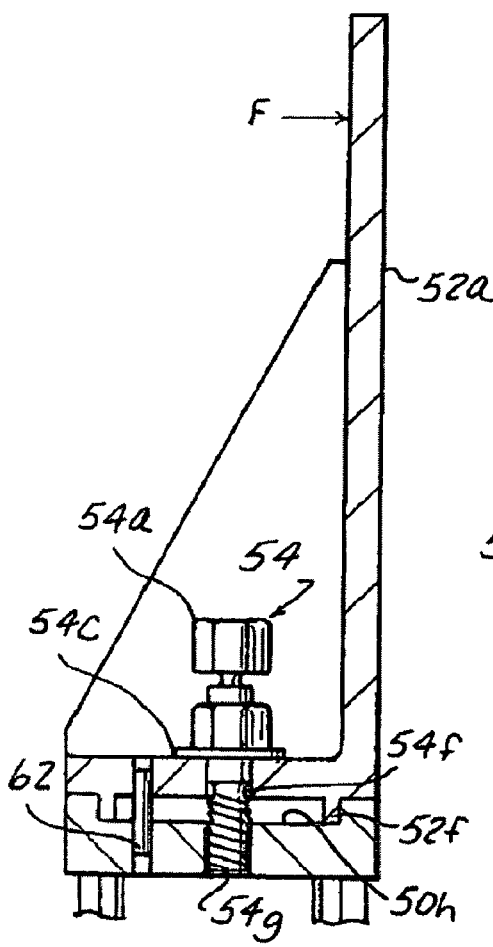
FIGS. 11, 12 and 13 illustrate an alternate mounting bracket structure.
Figure 12:
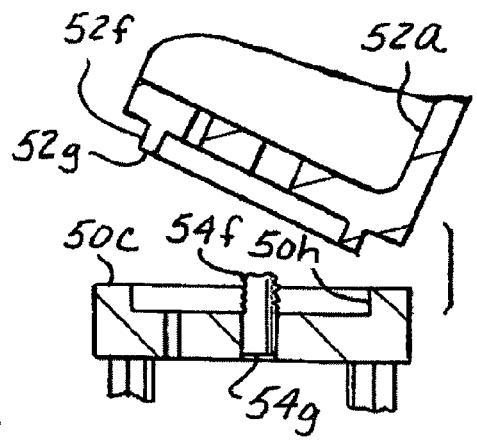
Figure 13:
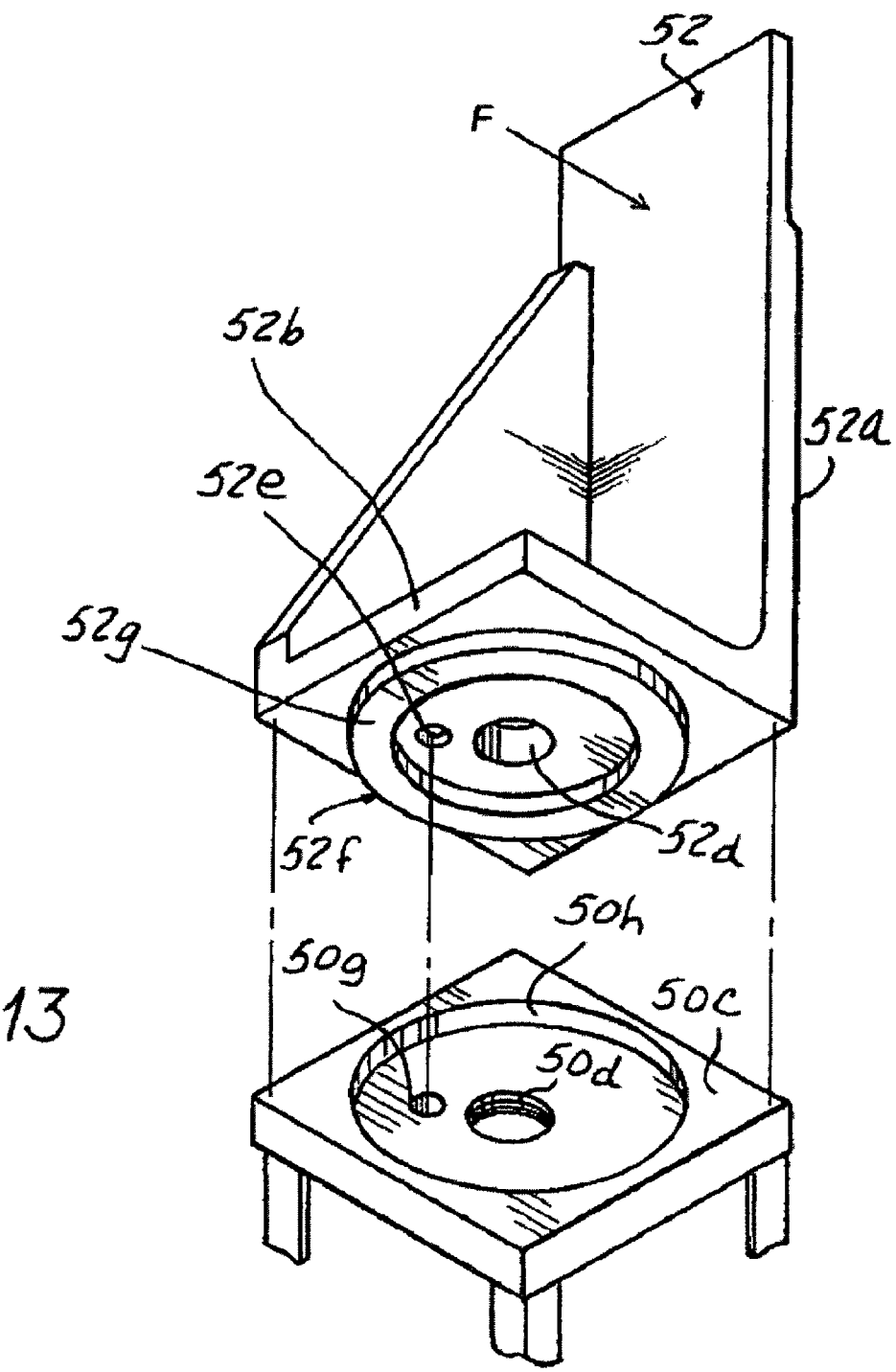

In the alternate bracket structure seen in FIGS. 11-13, the underside of each horizontal portion 52b of each riser includes a ring structure 52f centered on the central aperture 52d, and defining a circular ring surface 52g centered on aperture 52d. Ring structure 52f is sized to seat within a circular socket 50h formed in the upper face 50c of the platform portion of the base 50. In this case, a force F applied to the vertical portion 52a of a riser results in tilting of the horizontal portion 52b of the riser about a fulcrum defined by a point on the ring 52f. This arrangement, as with the FIGS. 1-13 embodiment, insures that the same moment loading will be applied to the bolt structure, and particularly to the reduced diameter portion 54f of the bolt structure, irrespective of the direction of impact of an obstacle against the vertical portion of the riser and further insures a firm positive triangulated interface engagement of the riser on the base. In this case a dowel is not necessary to preclude sliding of the riser relative to the base but a dowel 62 is nevertheless employed, received in apertures 52e and 50g, to assist in orientation of the riser relative to the base.

It will be seen that, either with respect to the bracket structure seen in FIGS. 1-12 or the structure seen in FIGS. 11-13, the bolt structure 54 will shear at the reduced diameter portion 54f before any significant twisting or other damage can be sustained by the delicate frame structure. It will be further seen that, in either construction, the concentric arrangement of the ring 50k or the ring 52f insures that the bolt structure will shear under the same impact irrespective of the direction of the impact force imposed by the encountered obstacle.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, although the invention has been described with respect to a motor vehicle total car body framing apparatus, it will be understood that the invention is also applicable to partial body or component motor vehicle framing apparatus and is also applicable to the assembly of aircraft bodies or other body structures.

What is claimed is:

1. A mounting bracket connecting a tooling member to an elongate tubular framing member, the mounting bracket comprising:

a base having a substantially planar surface defining an outer perimeter and at least two independent radially distant legs positioned proximate the substantially planar surface perimeter adapted to extend angularly downward from the substantially planar surface in partially surrounding engagement with the frame member;

a riser mounted on the base at an interface adapted to connect the tooling member to the frame member; and a single central fastener bolt operative to fixedly mount the riser on the base, the fastener bolt comprising a longitudinal axis and a shank positioned below a bolt head, the shank having a first diameter portion and a reduced second diameter portion adapted to break away in response to a predetermined impact against the riser the interface between the riser and the base comprises a plurality of contact points arranged in concentric relation with respect to the fastener bolt.

2. A mounting bracket according to claim 1 wherein the fastener bolt passes through an unthreaded central aperture in the riser positioned proximate the geometric center of the riser for threaded engagement with a threaded central aperture in the base positioned proximate the geometric center of the base planar surface.

3. A mounting bracket according to claim 1 wherein:
the head portion also includes a reduced diameter portion; and
the reduced diameter portion of the head portion is designed to shear before the reduced second diameter portion of the shank portion so that tightening of the fastener bolt until the reduced diameter head portion shears has the effect of pre torqueing the fastener bolt to the torque level required to shear the reduced diameter head portion.

4. A mounting bracket according to claim 1 wherein the mounting bracket further includes at least one dowel received in aligned apertures in the base and in the riser at a location radially offset from the axis of the fastener bolt.

5. A mounting bracket according to claim 4 wherein the mounting bracket includes two dowels received in aligned apertures in the base and in the riser at locations flanking the axis of the fastener bolt.

6. A mounting bracket according to claim 1 wherein the mounting bracket further includes an annular interface surface positioned between the base and the riser wherein the riser abuttingly engages the base.

7. A mounting bracket according to claim 6 wherein the annular interface surface comprises a raised ring surface on one of the base and the riser radially distant from and concentric with the axis of the fastener bolt, the radial distance forming a cavity between the raised ring and the fastener.

8. A mounting bracket according to claim 7 wherein the raised ring is defined on the riser.

9. A mounting bracket according to claim 7 wherein:
a series of lugs are defined on an inner periphery of the ring, each lug defining an aperture for selective receipt of a dowel.

10. A mounting bracket according to claim 8 wherein the raised ring surface is received in a socket formed in a confronting face of the base.

11. A mounting bracket connecting a tooling member to an elongate transverse tubular framing member, the mounting bracket comprising:
a base having at least two independent and radially separate legs extending downward from a base platform, each of the legs and the platform adapted to be in abutting engagement with the elongate transversely positioned framing member;
a riser connected to the base at an interface surface by a single break-away central fastener bolt, the fastener including a head portion and a shank portion, the shank portion having a longitudinal axis and a first diameter and a second diameter, the second diameter smaller than the first diameter, wherein the interface surface comprises a plurality of contact points radially distant from the fastener axis adapted to form a fulcrum for concentrating stress at the fastener shank second diameter on application of a predetermined force on the riser to locally fracture the fastener at the shank second diameter permitting controlled disengagement of the riser from the base.

12. A mounting bracket according to claim 11 wherein the fastener bolt head portion includes a first diameter and a second diameter, the second diameter smaller than the first diameter, wherein on application of a predetermined torque force to the head portion, the head second diameter is adapted to fracture prior to fracture of the shank second diameter.

13. The mounting bracket of claim 1 wherein the riser is an integral part of the tooling member.

14. The mounting bracket of claim 11 wherein the riser is an integral part of the tooling member.

15. A mounting bracket and a body framing apparatus located at a welding station, the framing apparatus including at least one tooling member for use in positioning components of the body at the welding station for welding, the at least one tooling member mounted on the framing apparatus by a mounting bracket, characterized in that:
a mounting bracket includes a base adapted for mounting on the framing apparatus;
a riser mounted on the base at a triangulated mounted interface between the riser and the base, the riser adapted for mounting a respective tooling member to the framing apparatus; and
a single central fastener bolt having an axis and operative to fixedly mount the riser on the base, the fastener bolt includes a reduced diameter portion sized to break away in response to a predetermined impact against the riser, wherein the mounted interface includes a raised ring surface on the riser positioned at the interface and centered on the axis of the fastener bolt, the ring further having a series of lugs defined on an inner periphery of the ring, each lug defining an aperture for receipt of a dowel.

* * * * *